United States Patent [19]

Mounts et al.

[11] 4,281,344
[45] Jul. 28, 1981

[54] VIDEO INTERFRAME TRANSFORM CODING TECHNIQUE

[75] Inventors: Frank W. Mounts, Colts Neck; Arun N. Netravali, Matawan, both of N.J.

[73] Assignee: Bell Telephone Laboratories, Incorporated, Murray Hill, N.J.

[21] Appl. No.: 146,188

[22] Filed: May 2, 1980

[51] Int. Cl.³ .............................................. H04N 7/12
[52] U.S. Cl. .................................................... 358/136
[58] Field of Search ............... 358/133, 135, 136, 260, 358/261; 364/515; 370/19

[56] References Cited

U.S. PATENT DOCUMENTS

| | | | |
|---|---|---|---|
| 3,571,505 | 3/1971 | Mounts | 358/136 |
| 3,984,626 | 10/1976 | Mounts et al. | 358/136 |
| 4,133,006 | 1/1979 | Iinuma | 358/136 |
| 4,202,011 | 5/1980 | Koga | 358/136 |
| 4,215,374 | 7/1980 | Mizumo | 358/136 |

OTHER PUBLICATIONS

H. W. Jones, "A Real-Time Adaptive Hadamard Transform Video Compressor," 1976, S.P.I.E., vol. 87, Advances in Image Transmission Techniques, pp. 2-9.
H. W. Jones, "A Conditional Replenishment Hadamard Video Compressor," 1977 S.P.I.E., vol. 119, Application Digital Image Processing, pp. 91-98.
J. A. Roese, "Intraframe Coding of Digital Images Using Transform and Hybrid Transform/Predictive Techniques," USCIPI Report 700, 6-1976.
S. C. Noble et al., "A Real-Time Hadamard Transform System for Spatial and Temporal Redundancy Reduction in Television," 1973, Proc. of International Telemetering Conference.

*Primary Examiner*—John C. Martin
*Assistant Examiner*—Edward L. Coles
*Attorney, Agent, or Firm*—Barry H. Freedman

[57] ABSTRACT

The efficiency with which a video signal is encoded is increased by examining successive blocks of M picture elements to determine which K pels have frame differences which do not exceed a predetermined threshold. The values of these K pels are intentionally altered, and the pels are applied to a transform circuit which generates $N \leq M$ corresponding coefficient values. Only $N-K$ of the coefficient values, and a code indicating the unchanged pel locations are then encoded for transmission. The decoder (and the feedback loop of the encoder) is arranged to recover the original picture using only the frame differences for pels which have changed significantly.

15 Claims, 8 Drawing Figures

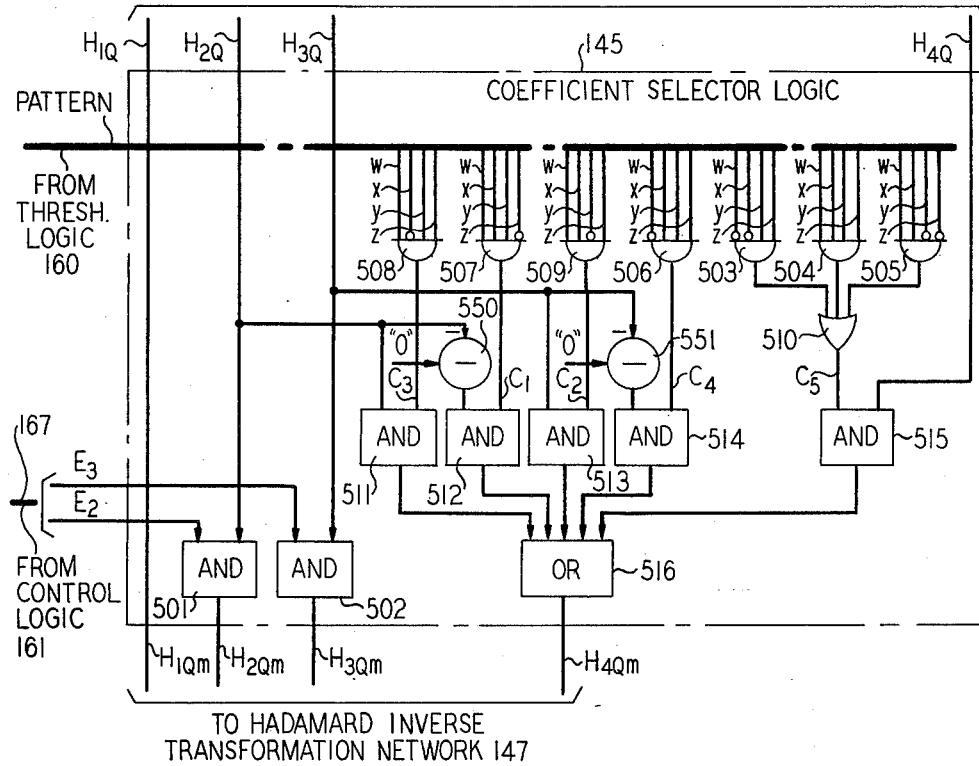
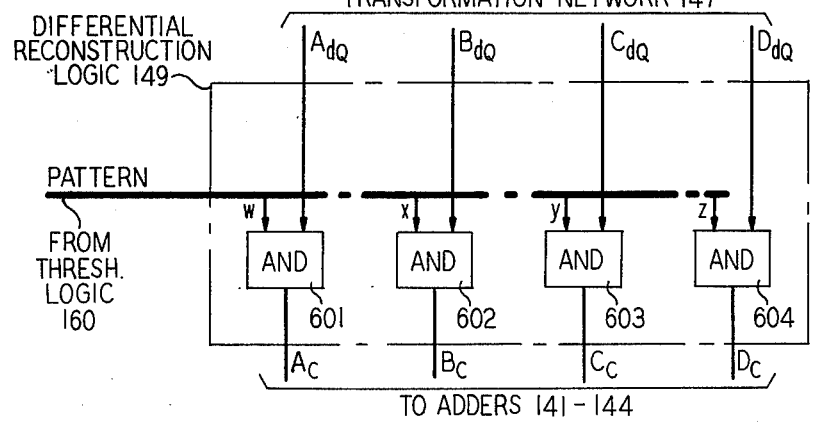

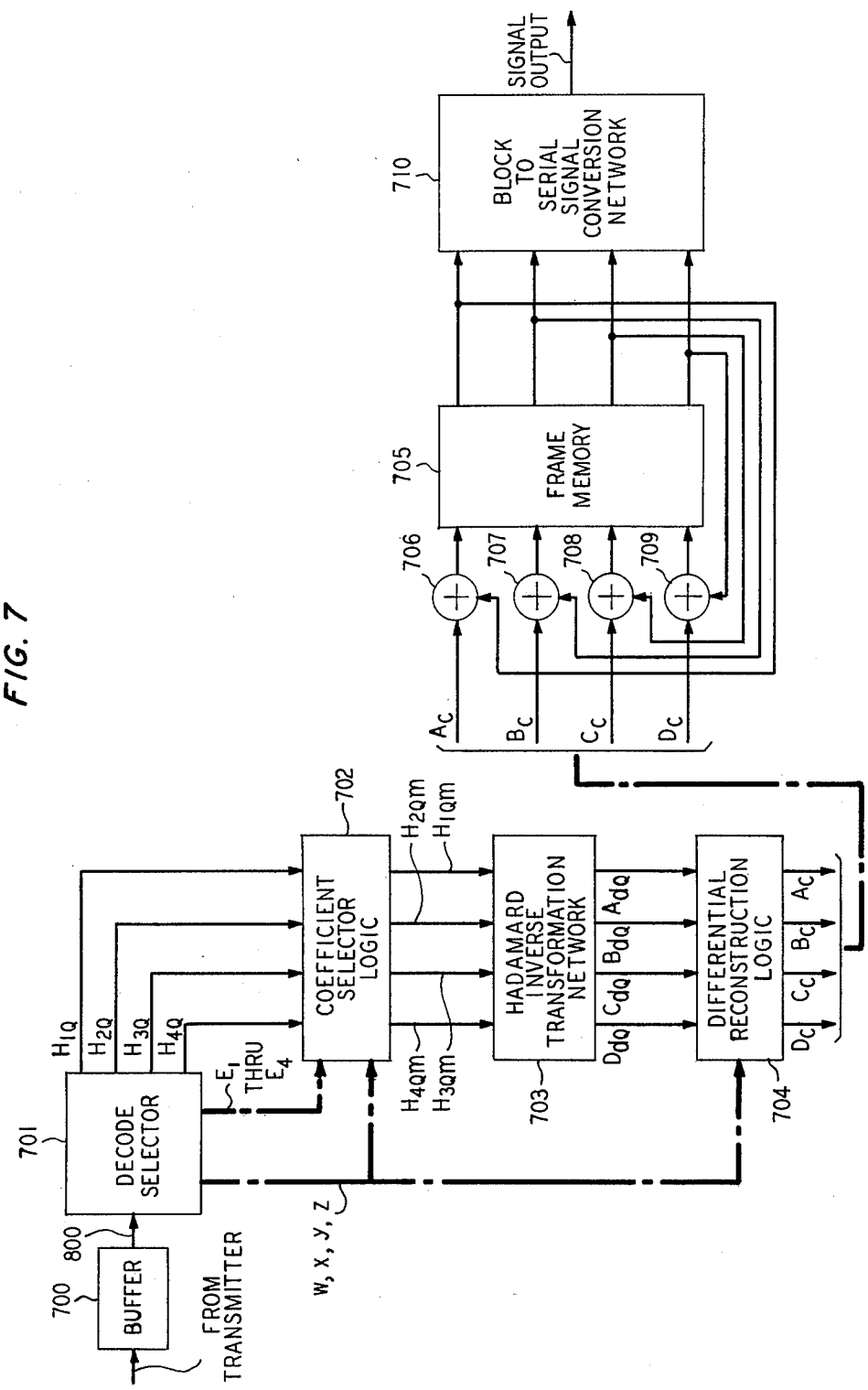

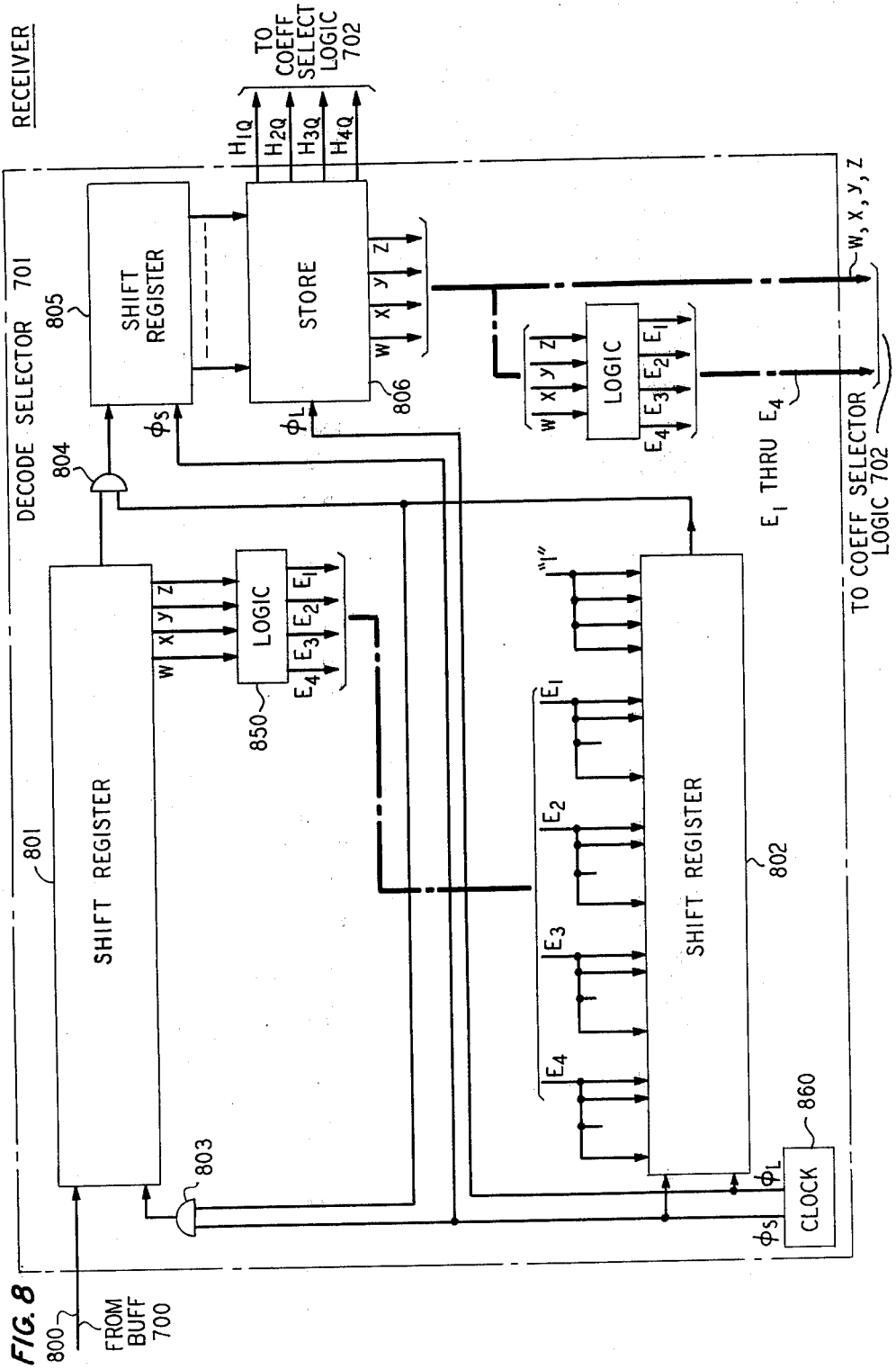

VIDEO INTERFRAME TRANSFORM CODING TECHNIQUE

TECHNICAL FIELD

The present invention relates generally to encoding of pictorial information and, in particular, to a technique for interframe coding of a video signal using (orthogonal) transformations.

BACKGROUND OF THE INVENTION

About a decade ago, conditional replenishment encoding of video signals was developed by F. W. Mounts and others to take advantage of the fact that a significant portion of a picture represented by a video signal does not change in the time interval between successive frames. In U.S. Pat. No. 3,571,505 issued Mar. 16, 1971, F. W. Mounts describes a technique wherein intensity differences and address information is transmitted for only those elements of the picture which have changed by more than a predetermined threshold. Since that initial work, numerous improvements have been made in the technique used to detect changes, in the schemes used to transmit the addresses of the changed pels and, indeed, the use of similar or related techiques has dramatically expanded to other areas of picture processing such as color video systems.

Another technique, also designed to improve the efficiency with which pictorial information is encoded, involves a linear transformation of the data at the transmitter, and a corresponding inverse transformation at the receiver. Such transformations, usually accomplished to adjust the characteristics of the signal to be transmitted to the transmission medium or to take advantage of statistical tendencies exhibited by the data, include Hadamard, Haar, cosine and slant transforms, and several others. U.S. Pat. No. 3,984,626 issued to F. W. Mounts, A. N. Netravali and B. Prasada on Oct. 5, 1976, is exemplary of transform coders, and describes a technique in which one of the transform coefficients can be efficiently coded, usually as a function of the values of other coefficients.

The two techniques just mentioned, namely, conditional replenishment and transform coding, have been combined to yield a hybrid type of coding in an attempt to obtain the advantages of both. In hybrid coding, small blocks of picture elements are applied to a transformation circuit and the coefficients thus obtained are compared with stored coefficients for previously processed pel blocks. The previous coefficients serve as predictors for the coefficients of the present block, and only the prediction errors need be encoded for transmission.

In one specific hybrid scheme that has been studied, a one-dimensional block of picture elements (lying along a single scan line) is transformed and the coefficients DPCM encoded with respect to coefficients from a vertically displaced block such as that from the previous scan line. In other schemes, which employ intraframe and interframe coding, respectively, the coefficients for a two-dimensional block are compared with a horizontally displaced block in the same frame or a spatially corresponding block in a previous frame. Also illustrative of hybrid encoding systems is the work of J. A. Roese described in a paper entitled "Interframe Coding of Digital Images Using Transform and Hybrid Transform/Predictive Techniques", which appeared in the University of Southern California Image Processing Institute Report No. 700, dated June, 1976, and a paper by Noble, Knauer and Giem entitled "A Real Time Hadamard Transform System for Spatial and Temporal Redundancy Reduction in Television" which was published in the *Proceedings of the International Telemetering Conference* in October, 1973. Yet another transform encoding work, by H. W. Jones, Jr., is described in Vols. 87 and 119 of the *Proceedings of the Society of Photo-optical Instrumentation Engineers* at pages 2 and 91, respectively.

While the combination of the conditional replenishment and the transform coding techniques produces improvements in picture quality at a given transmission rate, or enables transmission of good quality pictures over a channel with reduced bandwidth, not all of the potential of hybrid coding has been achieved, since the two techniques are incompatible, at least in one sense. The transform technique is intended to represent the changes in the intensity values of all of the pels in each block in a different form, namely, as a series of coefficient values. If not all of the intensity values change, the entire series of coefficients still must be computed, since even one intensity change can effect all coefficients. This situation results in processing and transmission of extra information which, in turn, reduces encoder efficiency.

In view of the foregoing, it is the broad object of the present invention to improve encoding of pictorial information using linear transformations, whereby the amount of information needed to represent a picture of desirable quality is reduced. A specific object is to allow efficient coding of the transform coefficients which represent the intensity values of a block of picture elements when not all of the intensity values have changed from the previous picture frame.

SUMMARY OF THE INVENTION

In accordance with the present invention, the frame differences for a block of N picture elements are examined to determine which, if any, of the pels have changed by more than predetermined amounts in a frame interval. Based upon this analysis, the locations of the K unchanged pels are encoded (using any standard prior art technique such as run length coding) and transmitted to the receiver. In additon, the intensity values of K certain pels within the block are intentionally modified. The N pel intensity values, including the K modified values, are then applied to a linear transform network arranged to provide corresponding coefficient values representative thereof. However, in accordance with the invention, the values of K of these coefficients need not be encoded for transmission, since the omitted values are advantageously derivable at the receiver.

The encoder also includes a feedback loop arranged to reconstruct the intensity values for each block of picture elements by applying the N-K retained coefficient values to an inverse transformation circuit, and by recovering the frame differences for the block using both the inverse transform output and the location of the unchanged pels. Frame differences thus obtained are combined with previous intensity values stored in a frame memory to yield the reconstructed intensity values. The feedback loop is completed by using the stored intensity values to compute the frame differences for the next block of picture elements.

DESCRIPTION OF THE DRAWING

A full appreciation of the construction of the present invention as well as its features and advantages will be obtained by consideration of the following detailed description which read in light of the accompanying drawing in which:

FIG. 5 is a logic diagram of coefficient selector logic 145 of FIG. 1;

FIG. 6 is a logic diagram of differential reconstruction logic 149 of FIG. 1;

FIG. 7 is a block diagram of a receiver for decoding signals received from the transmitter of FIG. 1; and FIG. 8 is a block diagram of decode selector 701 of FIG. 7.

DETAILED DESCRIPTION

Figure 1:
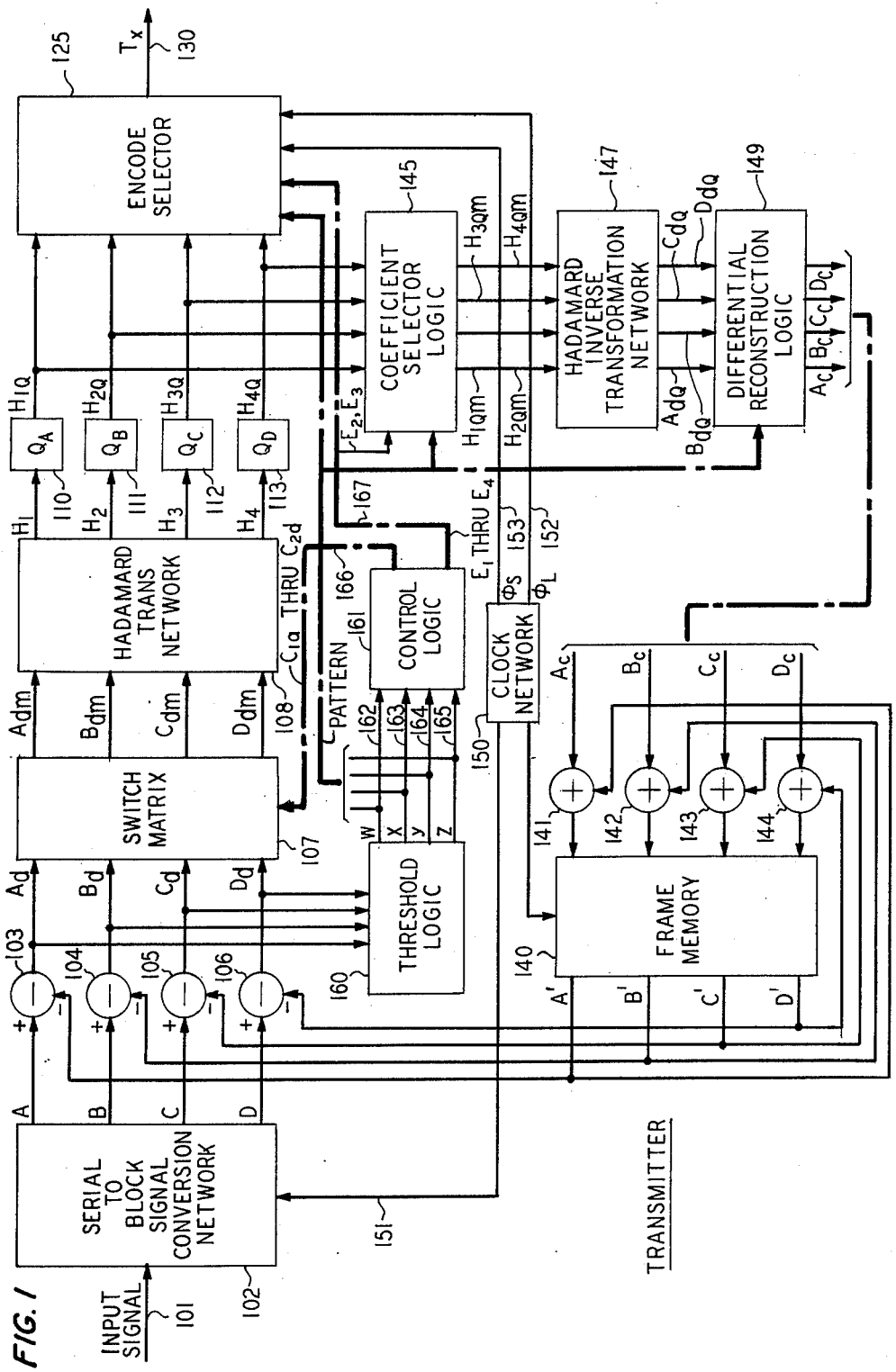
FIG. 1 is a block diagram of an interframe transform coder constructed in accordance with the principles of the present invention.

In the encoder circuit of FIG. 1, an input signal representing pictorial information is applied on input line 101 to a "serial to block" conversion network 102. The input signal can be a video signal obtained by scanning each frame of a picture to be processed along a plurality of scan lines, and sampling the scanner output at a desired rate so that each sample represents the intensity of a corresponding element (pel) in the picture. Alternatively, the input signal can represent a sequence of frames stored in a computer, or magnetic tape or another storage medium, and made available to line 101 on a pel by pel basis.

Conversion network 102 may comprise a series of delay elements having delay times equal to the time interval between adjacent pels and between successive scan lines. Depending on the scanning arrangement used to generate the input samples, the specific delay elements within network 102 are designed to make the intensity values of a "block" of pels simultaneously available, by selectively delaying certain of the pels. While a "block" may be one dimensional, including pels which lie along a single scan line, two-dimensional block sizes of 4×4 or 16×16 pels are typical. However, for purposes of simplicity and ease of description, it is assumed that network 102 is arranged to simultaneously provide four intensity values A, B, C and D for a two-by-two block of pels. Successive blocks are made available every second pel interval, but on every other line, by a timing pulse on line 151 generated by a clock network 150.

Each of the intensity values A, B, C and D is applied to a first input of a respective subtraction circuit 103 through 106, each of which may be readily available integrated circuits adapted for parallel arithmetic. The subtraction circuits, and the remainder of FIG. 1, is illustrated using single interconnecting leads for intensity and coefficient values, it being understood that these signals are generally represented by multiple bits carried on multiwire cables.

The second input to each subtraction circuit is derived from a frame memory 140, to be described more fully hereinafter, which is arranged to store reconstructed intensity values for the block of pels in the same spatial position as the block presently being processed, but in the previous picture frame. The stored intensity value for pel A, designated A′, thus acts as a predictor for the intensity value of that pel, and the difference output of subtraction circuit 103 is $A_d$, called the prediction error. Similarly, the outputs of subtraction circuits 104 through 106 are $B_d$, $C_d$ and $D_d$, respectively, the prediction errors for the other pels in the block. These differerences are applied to both a switch matrix 107, and to a threshold logic circuit 160 which, in combination with a control logic circuit 161 controls the output from switch matrix 107.

In accordance with one of the features of the present invention, threshold logic circuit 160 is arranged to compare each of the prediction errors $A_d$ through $D_d$ with a predetermined threshold value to determine which, if any, of the pels have changed significantly in the time interval between frames. As an example, if the pel intensity values can have any of 256 possible levels represented by eight bits, a prediction error of four levels may be considered "significant". The results of the comparision, which may be implemented using ordinary comparator circuits, are indicated by control signals W, X, Y and Z on lines 162, 163, 164 and 165, respectively, which are coupled to logic circuit 161. If the threshold is exceeded for pel A, i.e., if $A - A' = A_d > T$, then W is a logical one. If the difference is smaller, W is a logical zero. Similarly, X, Y and Z are high if $B_d$, $C_d$ or $D_d$ exceed the threshold values, and low otherwise. It is to be noted here that different threshold values may be used for each of the frame differences $A_d$ through $D_d$, if desired.

The control signals W, X, Y and Z output from logic 160 are applied to a control logic circuit 161 which in turn controls switch matrix 107. The overall strategy of the arrangement of logic 161 is to permit matrix 107 to intentionally change or distort some of the prediction error values $A_d$ through $D_d$, depending upon the pattern of control signals W through Z. More specifically, if the prediction error for a single pel is below the threshold, the prediction errors for the other three pels (which have changed significantly) are used for encoding purposes. However, the prediction error for the single pel is intentionally modified by setting it equal to one of the other error values. If the prediction errors for two pels are below the threshold, the prediction errors for the other two pels (which have changed significantly) are used for encoding purposes. However, the prediction errors for the first mentioned two pels are intentionally modified by setting each of theme equal to one of the error values for the last mentioned pels.

If the prediction errors for three pels are below the threshold, the prediction error for the remaining pel is used, not only to represent that pel, but also to represent the remaining pels, whose prediction errors are intentionally changes. If none of the prediction errors exceeds the threshold, a "don't care" situation exists, since the receiver can reconstruct the picture prediction error information. Conversely, if all of the errors exceed the threshold, all are necessary for reconstruction at the receiver and no modification occurs.

The manner in which the foregoing modification occurs is more specifically described in the following table, in which $A_{dm}$, $B_{dm}$, $C_{dm}$ and $D_{dm}$ represent the outputs of switch matrix 107 after the modification described above have been made.

TABLE 1

| LINE | CONTROL SIGNALS |   |   |   | VALUE OF |   |   |   |
|---|---|---|---|---|---|---|---|---|
|   | W | X | Y | Z | $A_{dm}$ | $B_{dm}$ | $C_{dm}$ | $D_{dm}$ |
| 1 | 1 | 1 | 1 | 1 | $A_d$ | $B_d$ | $C_d$ | $D_d$ |
| 2 | 1 | 1 | 1 | 0 | $A_d$ | $B_d$ | $C_d$ | $A_d$ |
| 3 | 1 | 1 | 0 | 1 | $A_d$ | $B_d$ | $D_d$ | $D_d$ |
| 4 | 1 | 1 | 0 | 0 | $A_d$ | $B_d$ | $A_d$ | $B_d$ |
| 5 | 1 | 0 | 1 | 1 | $A_d$ | $C_d$ | $C_d$ | $D_d$ |
| 6 | 1 | 0 | 1 | 0 | $A_d$ | $A_d$ | $C_d$ | $C_d$ |
| 7 | 1 | 0 | 0 | 1 | $A_d$ | $A_d$ | $D_d$ | $D_d$ |
| 8 | 1 | 0 | 0 | 0 | $A_d$ | $A_d$ | $A_d$ | $A_d$ |
| 9 | 0 | 1 | 1 | 1 | $B_d$ | $B_d$ | $C_d$ | $D_d$ |
| 10 | 0 | 1 | 1 | 0 | $B_d$ | $B_d$ | $C_d$ | $C_d$ |
| 11 | 0 | 1 | 0 | 1 | $B_d$ | $B_d$ | $D_d$ | $D_d$ |
| 12 | 0 | 1 | 0 | 0 | $B_d$ | $B_d$ | $B_d$ | $B_d$ |
| 13 | 0 | 0 | 1 | 1 | $C_d$ | $D_d$ | $C_d$ | $D_d$ |
| 14 | 0 | 0 | 1 | 0 | $C_d$ | $C_d$ | $C_d$ | $C_d$ |
| 15 | 0 | 0 | 0 | 1 | $D_d$ | $D_d$ | $D_d$ | $D_d$ |
| 16 | 0 | 0 | 0 | 0 | $D_d$ | $C_d$ | $B_d$ | $A_d$ |

From line 2 of the above table, it is seen that if $A_d$, $B_d$ and $C_d$ are large (W, X, Y=1) $A_{dm}=A_d$, $B_{dm}=B_d$ and $C_{dm}=C_d$. However, since $D_d$ is small (Z=0), $D_{dm}$ is set equal to $A_d$ and not $D_d$ as expected. Similarly, from line 9, if W is low but the other control signals are high, $A_{dm}$ is intentionally modified to equal $B_d$, while $B_d$, $C_d$ and $D_d$ are not changed, but pass through switch matrix 107 and are output as $B_{dm}$, $C_{dm}$ and $D_{dm}$, respectively.

To illustrate this further, if both $A_d$ and $B_d$ are small, while $C_d$ and $D_d$ are large, then $C_d$ and $D_d$ are passed, unchanged, through switch matrix 107 to become $C_{dm}$ and $D_{dm}$ (line 13). However, $A_{dm}$ assumes the value $C_d$ and $B_{dm}$ assumes the value $D_d$. Similarly, when three of the four pels have not changed significantly (see line 15 as an example) the prediction error value of the changed pel $D_c$ is used for all the matrix outputs $A_{dm}$ through $D_{dm}$.

As explained previously, in the limiting cases, none of the prediction errors have changed significantly (line 16) or all have changed and exceed their respective thresholds (line 1). In the latter case, none of the differences are changed by switch matrix 107, since $A_d$ through $D_d$ must be encoded. In the former case, it does not matter if the values are changed or not, since as will be seen hereinafter, the receiver can accuratley reconstruct the intensity values for an unchanged block without any error information. Nevertheless, for the case where W through Z are all zero, $A_{dm}$ is $D_d$, $B_{dm}$ is $C_d$, $C_{dm}$ is $B_d$ and $D_{dm}$ is $A_d$, indicating that all of the prediction errors are intentionally changed. These changes are implemented only to simplify the arrangement of logic 161.

For pel blocks containing N picture elements, the function of matrix 107 can be generalized such that the values of those K pels for which the intensity values has not changed significantly in the time interval between successive frames (or several frames) are intentionally altered, in accordance with a predetermined pattern. Further, the changed values are advantageously the same as the prediction error values for pels that have changed, although, in some cases to be described hereafter, the unchanged values can be set to zero or some other pre-established constant.

Figure 2:
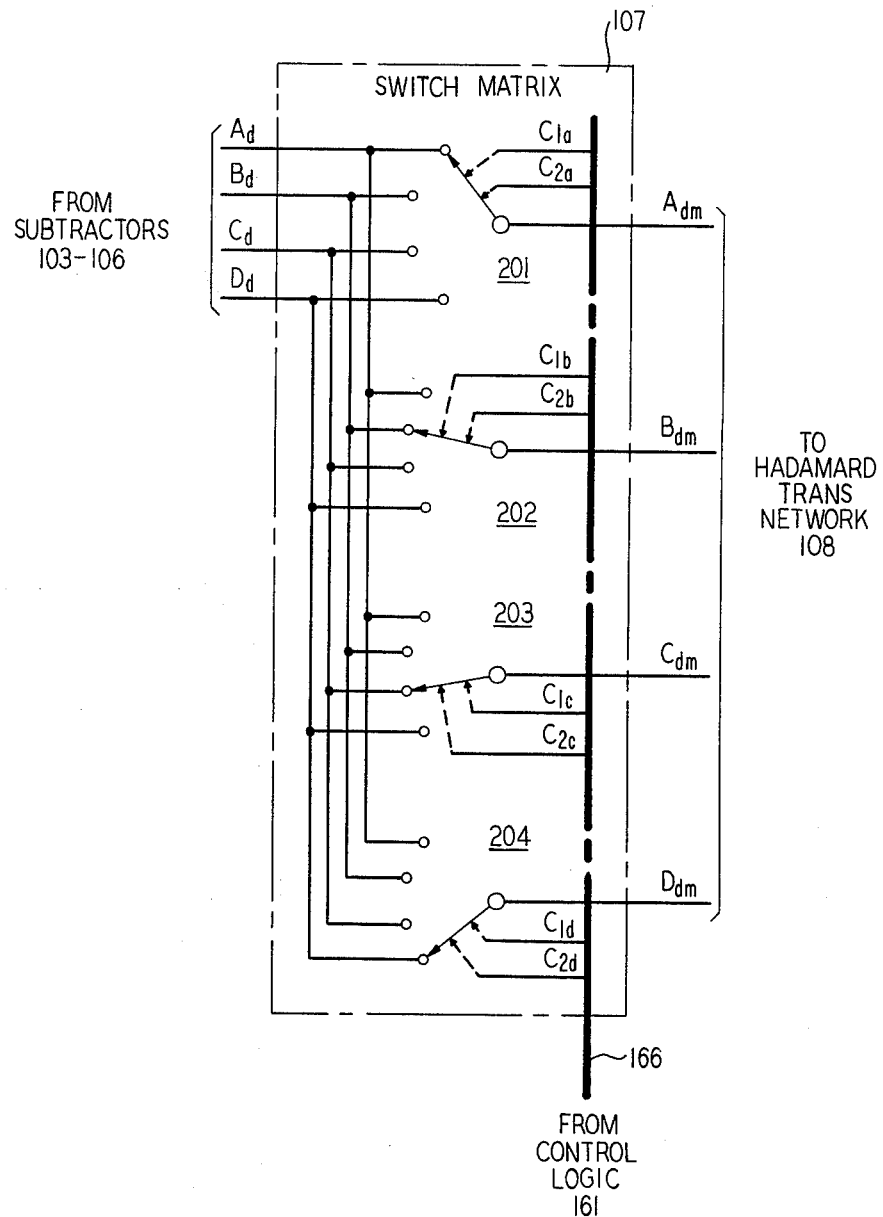
FIG. 2 is a circuit diagram of switch matrix 107 of FIG. 1.
Figure 3:
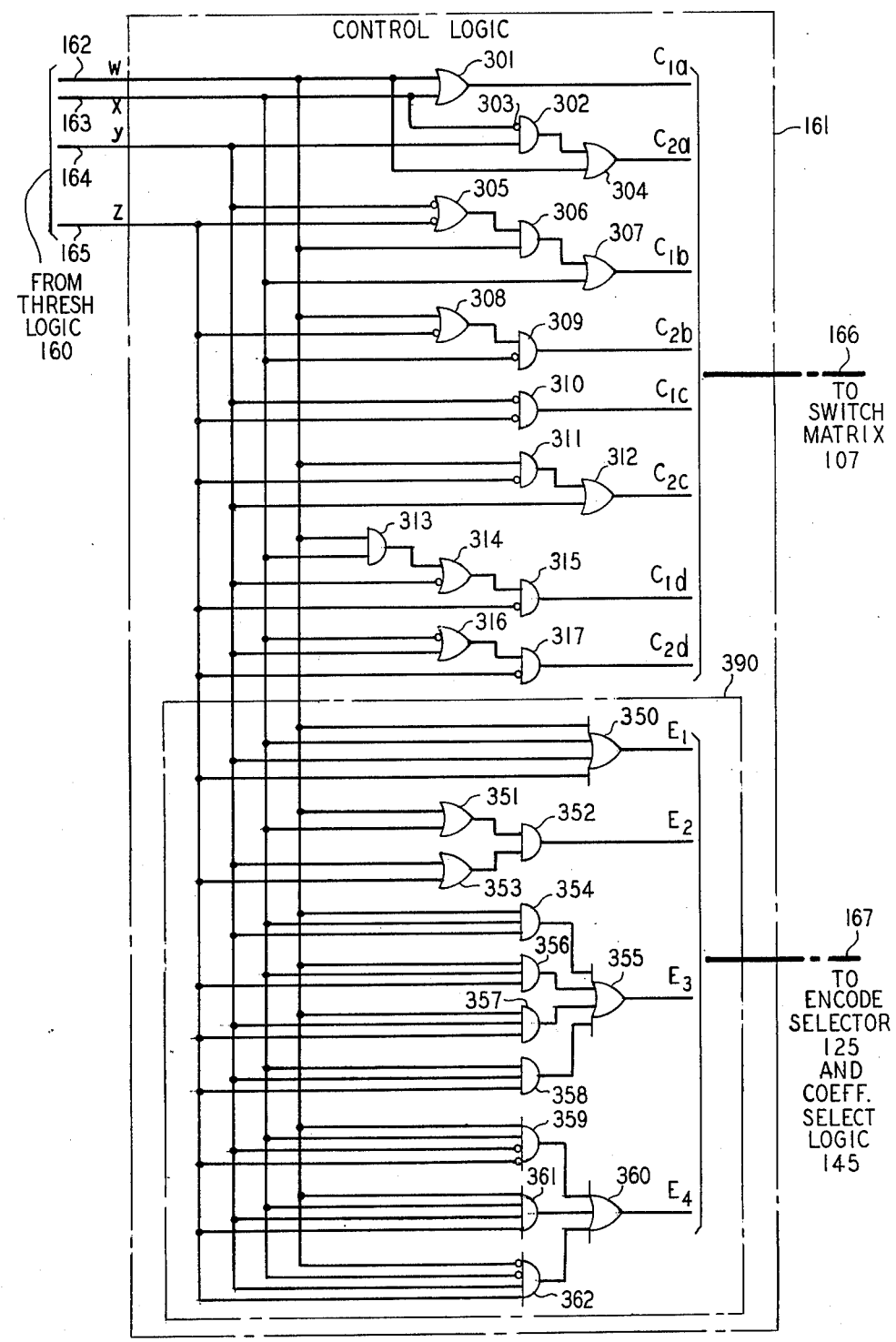
FIG. 3 is a logic diagram of control logic 161 of FIG. 1.

The detailed arrangements of switch matrix 107 and control logic 161 needed to implement the results shown in Table 1 are illustrated in FIGS. 2 and 3, respectively. In FIG. 2, matrix 107 is shown as including four separate switches 201 through 204, each of which receives all four prediction error inputs $A_d$ through $D_d$. Each switch also receives an individual pair of control signals, $C_{1a}$, $C_{2a}$ for switch 201, $C_{1b}$, $C_{2b}$ for switch 202, $C_{1c}$, $C_{2c}$ for switch 203 and $C_{1d}$, $C_{2d}$ for switch 204. These signals are developed in logic 161 and applied to matrix 107 via cable 163. Each switch can be a conventionally available two-bit data selector, arranged to connect a particular input through to the switch output in accordance with the following table:

TABLE 2

| CONTROLS |   | OUTPUT |
|---|---|---|
| $C_1$ | $C_2$ | DERIVED FROM |
| 1 | 1 | $A_d$ |
| 1 | 0 | $B_d$ |
| 0 | 1 | $C_d$ |
| 0 | 0 | $D_d$ |

FIG. 3 illustrates the arrangement of control logic 161 used to generate the control signals $C_1$ and $C_2$ of Table 2. For example, $C_{1a}$ is logically represented as W+X, and obtained by OR'ing those inputs from logic 160 in gate 301. Similarly, $C_{2a}$ is given by W+$\overline{XY}$, and uses AND gate 302, inverter 303, and OR gate 304. The remaining control signals are generated using the logic elements shown in FIG. 3, in accordance with the following table:

TABLE 3

| $C_{1a}$ | = W + X |
| $C_{2a}$ | = W + $\overline{XY}$ |
| $C_{1b}$ | = X + W($\overline{Y}$ + $\overline{Z}$) |
| $C_{2b}$ | = $\overline{X}$(W + $\overline{Z}$) |
| $C_{1c}$ | = $\overline{YZ}$ |
| $C_{2c}$ | = Y + W$\overline{Z}$ |
| $C_{1d}$ | = $\overline{Z}$(WX + $\overline{Y}$) |
| $C_{2d}$ | = $\overline{Z}$($\overline{X}$ + Y) |

In Table 3, multiplication indicates the logical AND function, the plus sign indicates logical OR'ing, and a bar "−" above a value indicates logical inversion.

Returning to FIG. 1, the modified prediction error values $A_{dm}$ through $D_{dm}$ output from switch matrix 107 are applied to a linear transform network 108, which is designed to transform the inputs from the "intensity" domain. As will be understood by those skilled in the art, such transformation contemplates a manipulation of the input variables to yield a series of output variables which have desirable properties for processing purposes, and which can be subsequently applied to an inverse transform circuit to recover the original information. Examples of possible linear transformations include Hadamard, Haar, slant and cosine transforms, to name a few. Generally speaking, to permit full recovery of N input variables, N coefficient values must be generated by transform network 108. However, many prior art video processing arrangements use fewer than N coefficients, discarding those coefficients that are less important. These arrangements may be used in conjunction with the present invention, if the accompanying degradation after decoding is tolerable. However, for illustrative purposes, it is hereafter assumed that four Hadamard coefficients $H_1$ through $H_4$ are obtained from transform network 108 in the coder of FIG. 1, which are defined as follows:

$$H_1 = A_{dm} + B_{dm} + C_{dm} + D_{dm} \tag{1}$$

$$H_2 = A_{dm} + B_{dm} - C_{dm} - D_{dm} \tag{2}$$

$$H_3 = A_{dm} - B_{dm} - C_{dm} + D_{dm} \tag{3}$$

$$H_4 = A_{dm} - B_{dm} + C_{dm} - D_{dm} \tag{4}$$

Each transform coefficient $H_1$ through $H_4$ output from transform network 108 is applied to an encode selector circuit 125 via a corresponding quantizer 110 through 113. The purpose of quantization is to assign fewer representative levels to the coefficient values, decreasing the precision but permitting more efficient encoding. Various nonlinear step size characteristics may be used and quantizers 110 through 113 need not have identical characteristics, as will be familiar to those skilled in the art. The outputs of quantizers 110 through 113 are designated $H_{1Q}$ through $H_{4Q}$, respectively, and are also applied to coefficient selection logic 145 to be described hereinafter.

In accordance with the present invention, not all of the coefficient values applied to encode selector 125 are passed through and applied to output line 30. Rather, the number of coefficients to be encoded is reduced by K, where K is the number of prediction error values that were altered, for the block being processed, in switch matrix 107. Thus, if N coefficients are output from transform network 108 and would ordinarily be encoded, then N−K are encoded using the apparatus of FIG. 1.

The selection of which coefficient values are to be passed through selector 125 is determined by the control signals W through Z applied to logic 161. Referring again to FIG. 3, it is seen that logic elements 350 through 362 are used to generate four control signals $E_1$ through $E_4$ in response to different logical combinations of signals W through Z. For the example being discussed, in which transform network 108 provides coefficients in accordance with equations (1) through (4), logic 161 is arranged such that when $E_1$ is high, $H_{1Q}$ is encoded. If $E_2$, $E_3$ or $E_4$ are high, $H_{2Q}$, $H_{3Q}$ or $H_{4Q}$, respectively, are encoded by logic 125.

Logic 161 is arranged so that $E_1$ is high if any one of the control signals W, X, Y or Z is high. $E_2$ is high if any of the logic terms WY, WZ, XY or XZ are high, while $E_3$ goes high only when any of the logic functions WXY, WXZ, WYZ or XYZ are high. Finally, $E_4$ is high if all of the control signals W through Z are high, or if the logic functions W$\overline{X}$YZ or W$\overline{X}$YZ are high.

The arrangement of this portion of logic 161 of FIG. 3 is further summarized in the following table:

TABLE 4

| Line | Control Signals | | | | Encode Coefficients | | | | Value Of Coefficients Not Transmitted |
|---|---|---|---|---|---|---|---|---|---|
| | W | X | Y | Z | $H_{1Q}$ | $H_{2Q}$ | $H_{3Q}$ | $H_{4Q}$ | |
| 1 | 1 | 1 | 1 | 1 | 1 | 1 | 1 | 1 | N/A |
| 2 | 1 | 1 | 1 | 0 | 1 | 1 | 1 | 0 | $H_{4Q} = H_{2Q}$ |
| 3 | 1 | 1 | 0 | 1 | 1 | 1 | 1 | 0 | $H_{4Q} = H_{3Q}$ |
| 4 | 1 | 1 | 0 | 0 | 1 | 0 | 0 | 1 | $H_{2Q} = H_{3Q} = 0$ |
| 5 | 1 | 0 | 1 | 1 | 1 | 1 | 1 | 0 | $H_{4Q} = H_{2Q}$ |
| 6 | 1 | 0 | 1 | 0 | 1 | 1 | 0 | 0 | $H_{3Q} = H_{4Q} = 0$ |
| 7 | 1 | 0 | 0 | 1 | 1 | 1 | 0 | 0 | $H_{3Q} = H_{4Q} = 0$ |
| 8 | 1 | 0 | 0 | 0 | 1 | 0 | 0 | 0 | $H_{2Q} = H_{3Q} = H_{4Q} = 0$ |
| 9 | 0 | 1 | 1 | 1 | 1 | 1 | 1 | 0 | $H_{4Q} = -H_{3Q}$ |
| 10 | 0 | 1 | 1 | 0 | 1 | 1 | 0 | 0 | $H_{3Q} = H_{4Q} = 0$ |
| 11 | 0 | 1 | 0 | 1 | 1 | 1 | 0 | 0 | $H_{3Q} = H_{4Q} = 0$ |
| 12 | 0 | 1 | 0 | 0 | 1 | 0 | 0 | 0 | $H_{2Q} = H_{3Q} = H_{4Q} = 0$ |
| 13 | 0 | 0 | 1 | 1 | 1 | 0 | 0 | 1 | $H_{2Q} = H_{3Q} = 0$ |
| 14 | 0 | 0 | 1 | 0 | 1 | 0 | 0 | 0 | $H_{2Q} = H_{3Q} = H_{4Q} = 0$ |
| 15 | 0 | 0 | 0 | 1 | 1 | 0 | 0 | 0 | $H_{2Q} = H_{3Q} = H_{4Q} = 0$ |
| 16 | 0 | 0 | 0 | 0 | 0 | 0 | 0 | 0 | DON'T CARE NONE TRANSMITTED |

The right-hand column of Table 4 indicates how the non-transmitted coefficient values are recoverable at the receiver using only the values of the transmitted coefficients and the locations of the pels which have not changed significantly. Several examples will illustrate. From line 2 of Table 4, when W, X and Y are high and Z is low, $D_{dm} = A_d$ and $H_{4Q}$ is not transmitted. For this condition, equations (2) and (4) yield the following coefficient values:

$$H_2 = A_d + B_d - C_d - A_d = B_d - C_d \tag{5}$$

$$H_4 = A - B + C - A_d = -B_d + C_d. \tag{6}$$

Accordingly, the value for $H_{4Q}$ can be assumed at the receiver to be equal to the transmitted value for $H_{2Q}$, but with a sign reversal. As a second example, from line 4 of Table 4, when W=X=1 and Y=Z=0, equations (2) and (3) are evaluated using $C_{dm} = A_d$ and $D_{dm} = B_d$. Thus:

$$H_2 = A_d + B_d - A_d - B_d = 0 \tag{7}$$

$$H_3 = A_d - B_d - A_d + B_d = 0. \tag{8}$$

Neither of these coefficient values are encoded for transmission, and the receiver reconstructs the values for $A_d$ through $D_d$ using $H_1$ and $H_4$ only. In general, then, the receiver, to be described hereafter, determines from the pattern of control signals W through Z which coefficients have not been encoded, and either reconstructs the appropriate value or sets the value to zero. When one coefficient has been discarded, its magnitude is equal to the magnitude of one of the transmitted coefficients. When two or three coefficients have been dropped, their values are zero. When all of the intensity values have changed significantly, all of the coefficient values are transmitted, and when none of the intensity values have changed significantly, none of the coefficient values need to be transmitted.

Figure 4:
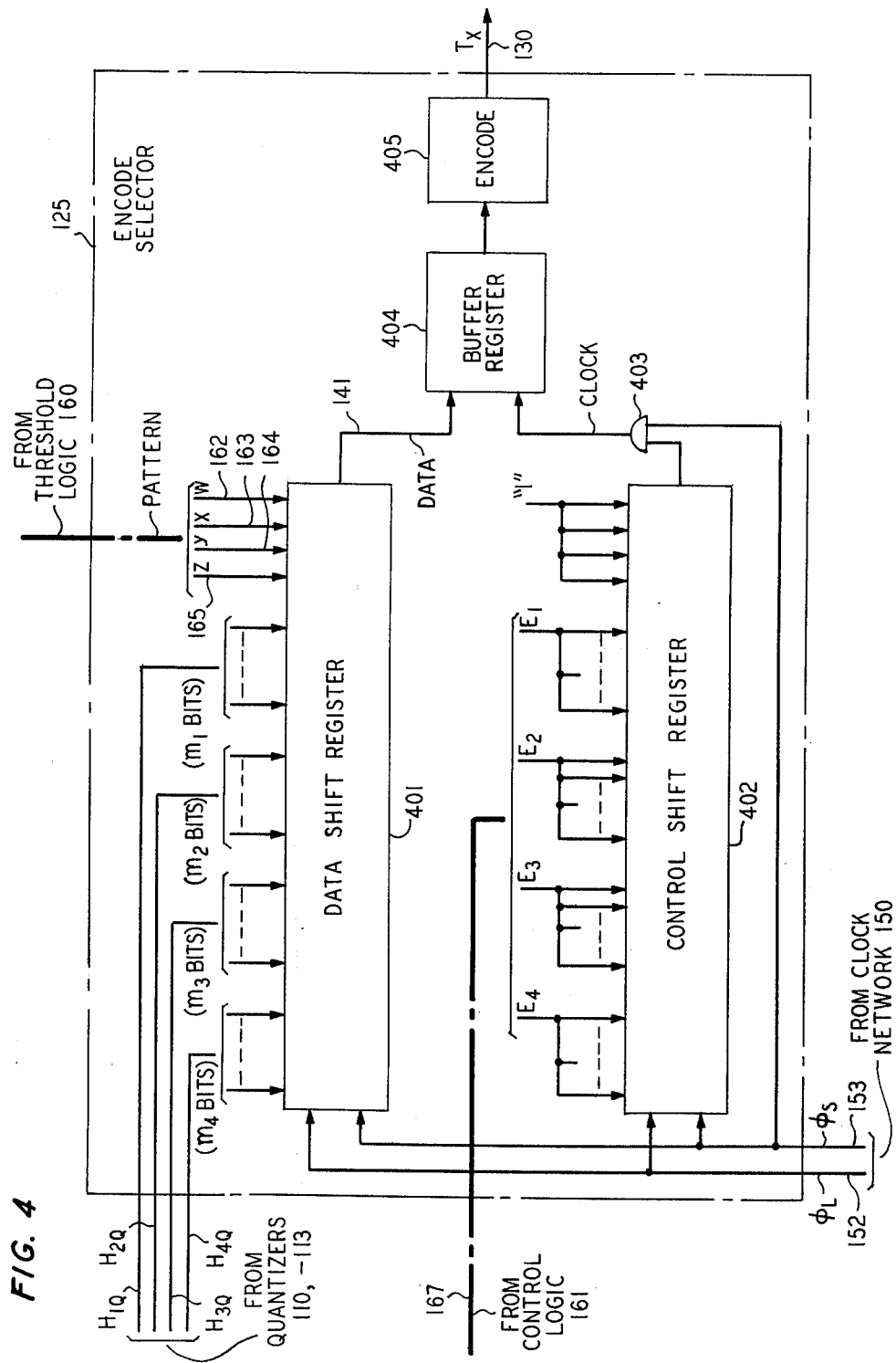
FIG. 4 is a block diagram of encode selector 125 of FIG. 1.

Encode selector 125 is shown in greater detail in FIG. 4. Transform coefficients $H_{1Q}$ through $H_{4Q}$ are parallel loaded in a first shift register 401, while corresponding control signals $E_1$ through $E_4$ from logic 161 are loaded in a second shift register 402, both under control of a $\phi_L$ load timing signal on line 152 derived from clock network 150. The control signals W, X, Y and Z are also loaded in register 401.

Register 401 is arranged to have sufficient capacity to store the number of bits needed to represent coefficients $H_{1Q}$ through $H_{4Q}$ plus control signals W through Z.

Each of the coefficients need not have the same number of bits, and customarily $H_{1Q}$ is expressed with greater precision. Register 402 has the same total length as register 401, but the bit positions corresponding to signals W through Z are preset to "1" at each occurrence of the load pulse $\phi_L$. Control signals $E_1$ through $E_4$ are each used to set the state of the portion of register 402 that corresponds to a particular coefficient value. For example, if coefficient $H_{1Q}$ is $M_1$ bits long, control signal $E_1$ (if high) inserts $M_1$ "1" bits into register 402 in the position corresponding to the $M_1$ bits of $H_{1Q}$ stored in register 401. If $H_{2Q}$ is $M_2$ bits long, and $E_2$ is low, $M_2$ "0" bits are inserted in register 402, again in the corresponding position. $H_{3Q}$ and $H_{4Q}$ are treated similarly.

After each register 401, 402 has been loaded as described, clock network 150 is arranged to provide a series of shift pulses $\phi_s$ on line 152 to each register, the total number of shift pulses per load pulse $\phi_L$ being the sum of the bit lengths of $H_{1Q}$ through $H_{4Q}$ plus W through Z. On the occurrence of each pulse $\phi_s$, the serial output of register 401 on line 411 is applied to the data input of a buffer register 404, while the serial output of register 402 allows the clock input of register 404 to receive $\phi_s$ pulses via AND gate 403. With this arrangement, the control signals W through Z are always entered in buffer register 404, since four "1" bits from register 402 are always provided for clocking. However, the coefficient values $H_{1Q}$ through $H_{4Q}$ are only clocked into register 404 if the corresponding control signals $E_1$ through $E_4$ are high, as is desired. The foregoing procedure is repeated for each succeeding block of pels.

The contents of buffer register 404 are applied to line 130 at a rate suitable for the transmission medium being used. If desired, additional and more sophisticated compression schemes may be used by interposing an encoder 405 between the buffer and the transmission medium. Techniques that can be used include run length or variable length coding, to name just two. These schemes are well known to those skilled in the art and are not necessary to practice the present invention.

The feedback loop of the encoder of FIG. 1 is arranged to recover or reproduce the same prediction error values that will be recovered at the receiver, and to add these values to stored intensity values for the same block of picture elements in the previous frame. For this purpose, a frame memory 140 having a delay time $\tau$ equal to the time interval between successive frames of the picture being processed has its outputs for a block of pels connected to first inputs of a series of adder circuits 141 through 144. The second input to each adder circuit is the reconstructed prediction error $A_c$ through $D_c$, derived in a manner to be described below. The feedback loop also includes a coefficient selection logic circuit 145, which receives the quantized coefficient values $H_{1Q}$ through $H_{4Q}$ output from quantizer 110 through 113, and generates a modified series of coefficient values $H_{1QM}$ through $H_{4QM}$ which are the same as those recovered in a receiver, as well as in an inverse transform network 147 and a reconstruction logic circuit 149, to be described hereinafter.

FIG. 5 illustrates the arrangement of coefficient selection logic 145 in more detail. The inputs to the circuit are the coefficient values $H_{1Q}$ through $H_{4Q}$ for the block of pels being processed, and control signals $E_1$ through $E_4$ and W through Z for the same block, derived from logic 161 and logic 160, respectively. The purpose of this circuit, as stated previously, is to "conform" the coefficient value $H_{1QM}$ through $H_{4QM}$ used in recovering the prediction errors $A_c$ through $D_c$ to those used by the receiver for the same purpose. Without this circuit, the local and remote circuits may not track, causing unwanted distortion. One potential reason for non-tracking can be the use of different quantizers 110 through 113 for different coefficients. For example, under some circumstances, $H_4$ and $H_3$ may be equal, but $H_{4Q}$ and $H_{3Q}$ unequal. Another source is unintentional quantizer non-linearities. If identical quantizers are used, however, logic 145 can be eliminated.

In FIG. 5, $H_{1Q}$ is always passed directly through logic 145 to become $H_{1QM}$. $H_{2Q}$ and $H_{3Q}$ are passed through AND gates 501 or 502 to become $H_{2QM}$ and $H_{3QM}$, respectively, provided $E_2$ and $E_3$ are high. When either $E_2$ or $E_3$ is low, the outputs of AND gates 501 or 502 are held low, again assuring appropriate tracking.

Correction of $H_{4Q}$ to yield $H_{4QM}$ is slightly more complicated. For this coefficient, control signals W, X, Y and Z are supplied to a series of AND gates 503 through 509 and OR gate 510 which essentially implement the relationships shown in the right-hand column of Table 5 by generating additional control signals $C_1$ through $C_5$. Each control signal is applied to one input of an associated AND gate 511 through 515, the other input of which is derived directly, or through a subtraction circuit (550 or 551), from inputs $H_{2Q}$ through $H_{4Q}$. Thus, with $C_1$ high, AND gate 512 sets $H_{4QM} = -H_{2Q}$, using subtraction circuit 550. For the remaining control signals, the following table illustrates the conversion:

TABLE 5

| If | | | |
|---|---|---|---|
| WX$\underline{YZ}$ | $C_1$ high | → | $H_{4QM} = -H_{2Q}$ |
| WXYZ | $C_2$ high | | $H_{4QM} = H_{3Q}$ |
| W$\overline{X}$YZ | $C_3$ high | | $H_{4QM} = H_{2Q}$ |
| $\overline{W}$XYZ | $C_4$ high | | $H_{4QM} = -H_{3Q}$ |
| WX$\underline{YZ}$ | $C_5$ high | | $H_{4QM} = H_{4Q}$ |
| WX$\overline{YZ}$ | $C_5$ high | | $H_{4QM} = H_{4Q}$ |
| $\overline{WX}$YZ | $C_5$ high | | $H_{4QM} = H_{4Q}$ |

The outputs of gates 511 through 515 are combined in OR gate 516, and form the desired value for $H_{4QM}$.

Turning again to FIG. 1, the coefficient values $H_{1QM}$ through $H_{4QM}$ output from logic 145 are applied to an inverse transform network 147 which is designed to reconstruct the corresponding quantized prediction error values $A_{dQ}$ through $D_{dQ}$ in the pel domain. Those skilled in the art will realize that network 147 essentially implements the inverse transformation in a manner quite similar to that used for the initial transformation. Indeed, for the Hadamard transform expressed in equations (1) through (4), the inverse transformation equations are as follows:

$$A_{DQ} = \tfrac{1}{4}(H_{1QM} + H_{2QM} + H_{3QM} + H_{4QM})$$

$$B_{DQ} = \tfrac{1}{4}(H_{1QM} + H_{2QM} - H_{3QM} - H_{4QM})$$

$$C_{DQ} = \tfrac{1}{4}(H_{1QM} - H_{2QM} - H_{3QM} + H_{4QM})$$

$$D_{DQ} = \tfrac{1}{4}(H_{1QM} - H_{2QM} + H_{3QM} - H_{4QM})$$

The recovered quantized prediction error values output from network 147 are applied to a differential reconstruction logic circuit 149, which serves to replace the "recovered" prediction error values for pels which have not changed significantly, with zero's. For this purpose, as shown in FIG. 6, control signals W through Z from logic 160 are applied to first inputs of AND gates 601 thtough 604, respectively, the other inputs of which are $A_{dQ}$ through $D_{dQ}$, also respectively. The substitutions performed by switch matrix 107 are thus altered so that any substituted prediction error is set to zero. The outputs of gates 601 through 604 are the prediction errors applied to adder circuits 141 through 144 to update the contents of memory 140.

Encoded coefficient and control signal (W through Z) values received at a remote location are decoded and the original pictorial information reconstructed, in much the same way as that used in the feedback loop of the encoder of FIG. 1. As shown in FIG. 7, a reciever arranged in accordance with the principles of the present invention includes a buffer 700 for receiving encoded information at the rate used by the transmission medium and decode selector 701, described in detail hereinafter, which recovers coefficient values $H_{1Q}$ through $H_{4Q}$ and control signals W through Z from the buffered signal. Selector 701 also generates control signals $E_1$ through $E_4$ for application to coefficient selector logic 702. The latter circuit, identical to logic 145 shown in FIG. 5, recovers coefficient values $H_{1QM}$ through $H_{4QM}$. Therafter, the coefficients are inverse transformed in network 703 to yield prediction error values $A_{dQ}$ through $D_{dQ}$, in an identical manner to that used in network 147 of FIG. 1. Differential reconstruction logic 704, which is the same as logic 149 of FIG. 6, regenerates the error values $A_c$ through $D_c$ used to update the intensity values stored in frame memory 705. Those pels having prediction errors below the threshold are identified using signals W through Z, and these prediction errors are set to zero. Adders 706 through 709 are provided to combine the stored contents of memory 705 with the update (prediction error values) $A_c$ through $D_c$ to yield new stored values. If desired, the intensity values output from memory 705 in parallel form may be converted to serial form using a block-/serial converter 710 which, like conversion network 102 of FIG. 1, may include a series of line and pel delay elements.

Decode selector 701 is shown in greater detail in FIG. 8. The output of buffer 700 on line 800 is input to a shift register 801 having a length equal to registers 401 and 402 of FIG. 4. The format used at both the encoder (FIG. 1) and the decoder is to follow control signals W through Z with the encoded coefficient values $H_{1Q}$ through $H_{4Q}$, if any have been encoded. It is to be clearly noted that some or all of the coefficients may not have been encoded, so that signals W through Z may be followed by one, two, three or four coefficient values, or immediately followed by another set of control signals for the next block of pels to be processed.

When the control signals W through Z are positioned in the front portion of register 801, a load signal $\phi_L$ (initially synchronized with the output from buffer 700) is used to load a second register 802 (of the same length and arrangement as register 402 of FIG. 4) such that four "1" bits are loaded into the front end positions corresponding to control signals W through Z, and so that an appropriate number of "1" or "0" bits are entered in the other predetermined portions of register 802, depending upon the state of control signals $E_1$ through $E_4$. These latter signals are derived from control signals W through Z using logic 850 which is identical to the logic within block 390 of FIG. 3.

After register 802 is loaded, $\phi_s$ clock signals (from a local clock 860) are used to serially read out the contents of register 802. The first four "1" bits output from register 802 enable AND gates 803 and 804 so that $\phi_s$ pulses can shift the first four bits in register 801 through AND gate 804 and into a holding register 805, which has the same capacity as registers 801 and 802. If any of the control signals $E_1$ through $E_4$ are high, the "1" bits loaded in register 802 allow the corresponding coefficient values to be shifted out of register 801, pass gate 804 and enter register 805. Conversely, if any of the control signals $E_1$ through $E_4$ are low, register 801 is not shifted while the "0" bits are read out of register 802, and "0" bits are entered in register 804 in place of the particular coefficient value which was not transmitted. After a sufficient number of $\phi_s$ pulses have been generated to clear the contents of register 802, the next $\phi_L$ pulse is generated, and the foregoing process is repeated. The $\phi_L$ pulse is also used to transfer signals W through Z and the coefficient values $H_{1Q}$ through $H_{4Q}$ to a temporary store 806. Logic 851, constructed identically to logic 390 of FIG. 3, converts signals W through Z to control signals $E_1$ through $E_4$ for use in coefficient selector logic 702.

Various modifications and adaptations of the present invention may be made by those skilled in the art, and for this reason it is intended that the invention be limited only by the appended claims.

For example, the control signals W through Z represent a "pattern" for each pel block, indicating which pels have changed significantly, and which have not. The frequency of occurrence for different patterns are apt to be different, so that those that occur more frequently may be represented for encoding purposes with shorter codes than those used for less frequent patterns.

As a second example, it is noted that for some pattern of control signals W through Z, the coefficient values that are to be encoded are evenly divisible by 2 or a multiple of 2, so that a compressor responsive to the pattern of the W through Z signals may be inserted in the encoder forward loop, preferably prior to the quantizers. In this case, a similar expansion is used in the feedback loop and in the receiver to retrieve the original values.

It is also to be noted that the fullness of the buffers in the encoder can be used to vary the thresholds in logic 160, so that if "space" is available in the transmission medium, the threshold is lowered, and vice-versa.

We claim:

1. Apparatus for encoding a series of samples each representing the intensity of an element in a picture, comprising:
   a. means (103-106) for forming the frame difference for each intensity value in a block of M pels, and
   b. means (108) for generating N (N≦M) transform coefficients representing said M frame differences, CHARACTERIZED IN THAT said apparatus further includes:
   c. means (107) for altering the value of the frame difference for any pel in said block if said frame difference is small, and
   d. means (125) for encoding the value of N−K of said coefficients, where K is the number of pels for which said frame difference is small.

2. The invention defined in claim 1 wherein said encoding means is further arranged to encode the locations of said K pels.

3. The invention defined in claim 1 wherein said altering means (107) is arranged to substitute the value of at least one of said frame differences for another one of said frame differences which has a value below a threshold.

4. The invention defined in claim 2 wherein said apparatus further includes:
  means (160) for comparing each of said frame difference values with a threshold value, and
  means (161) for generating control signals indicative of the pattern of pels in said block which exceed said threshold.

5. Apparatus for encoding a video signal representing a series of frames of a picture, including:
  a. delay means (102) for simultaneously providing a series of M samples for a block of elements in one of said frames of said picture,
  b. means (103-106, 140, 160, 161) including a frame memory for comparing the values of said samples with the values of a corresponding block of elements in said previous frame to identify K ($0 \leq K \leq M$) elements having values which have not changed by more than a predetermined amount;
  c. means (107) for modifying the values of K ones of said samples in response to said comparing means;
  d. means (108) for performing a linear transformation on the values of said K modified samples and the M−K unmodified samples to form M coefficient values, and
  e. means (125) for encoding the locations of said K elements and the values of M−K of said coefficients.

6. The invention defined in claim 5 wherein said modifying means (107) is arranged to substitute the values of selected ones of said samples for said K ones of said samples, said selected samples having frame differences which exceed said predetermined amount.

7. The invention defined in claim 6 wherein said linear transformation means is arranged to generate M Hadamard coefficients to represent said K modified and M−K unmodified sample values.

8. The invention defined in claim 6 wherein said encoding means (125) includes:
  a first register (401) for receiving said M coefficient values,
  a second register (402) for receiving M control signals generated as a function of the pattern of pels in said block having a frame difference which exceeds said predetermined amount, and
  means (403) for shifting M−K of said coefficient values from said first register into a buffer register (404) under control of the contents of said second register.

9. Apparatus for encoding a series of samples each representing the intensity of an element in a series of picture frames, comprising:

a. means for comparing the intensity values of a block of M pels in the present frame with the intensity values of corresponding pels in the previous frame to identify any K ($0 \leq K \leq M$) pels having frame difference values which do not exceed a predetermined threshold;
  b. means for modifying the intensity values of said K pels;
  c. means for generating M transform coefficients by performing a linear transformation on the intensity values of said M pels in said block including said K modified intensity values; and
  means for encoding (1) the locations of said K pels, and (2) the values of M−K of said coefficients.

10. The invention defined in claim 9 wherein said modifying means is arranged to substitute intensity values for pels in said block for which said frame difference exceeds said threshold for pels in said block for which said frame difference is smaller than said threshold.

11. The invention defined in claim 10 wherein said apparatus includes means for generating M control signals indicating which of said pels in said block have frame differences which exceed said threshold, and switch means responsive to said control signals for selecting said M−K coefficients for encoding.

12. A method of encoding a series of samples each representing the intensity of an element in a picture, comprising the steps of:
  a. forming the frame difference for each intensity value in a block of M pels, and
  b. generating N ($N \leq M$) transform coefficients representing said M frame differences,
CHARACTERIZED IN THAT said method further includes the steps of:
  c. altering the value of the frame difference for any pel in said block if said frame difference is small,
  d. encoding the value of N−K of said coefficients, where K is the number of pels for which said frame difference is small.

13. The method defined in claim 12 wherein said encoding step includes encoding the locations of said K pels.

14. The method defined in claim 12 wherein said altering step includes substituting the value of at least one of said frame differences for another one of said frame differences which has a value below a threshold.

15. The method defined in claim 13 wherein said location encoding step includes:
  comparing each of said frame difference values with a threshold value, and
  generating control signals indicative of the pattern of pels in said block which exceed said threshold.

* * * * *